United States Patent
Sakaino et al.

(10) Patent No.: US 7,065,667 B2
(45) Date of Patent: Jun. 20, 2006

(54) INTEGRATED CIRCUIT DEVICE TO GENERATE A CLOCK OF A SUITABLE FREQUENCY FOR OPERATING A PERIPHERAL DEVICE

(75) Inventors: Yasutaka Sakaino, Tokyo (JP); Kosuke Funabori, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 471 days.

(21) Appl. No.: 10/647,307

(22) Filed: Aug. 26, 2003

(65) Prior Publication Data

US 2004/0044921 A1    Mar. 4, 2004

(30) Foreign Application Priority Data

Aug. 29, 2002   (JP)   ............................ 2002/251073

(51) Int. Cl.
G06F 1/04   (2006.01)
G06F 1/06   (2006.01)

(52) U.S. Cl. ........................ 713/500; 713/300; 713/400

(58) Field of Classification Search ................ 713/300, 713/400, 500, 501, 600
See application file for complete search history.

(56) References Cited

FOREIGN PATENT DOCUMENTS

| JP | 08221151 A | * | 8/1996 |
| JP | 10232853 A | * | 9/1998 |
| JP | 2000242358 A | * | 9/2000 |
| JP | 2001-325244 | | 11/2001 |

* cited by examiner

Primary Examiner—Thomas Lee
Assistant Examiner—Mark Connolly
(74) Attorney, Agent, or Firm—Volentine Francos & Whitt, PLLC

(57) ABSTRACT

An integrated circuit device externally connected with a peripheral device operated by a first clock signal. The integrated circuit device includes a CPU having information on the frequency of the first clock signal, a clock generator generating a second clock signal for operating the CPU and outputting third clock signals obtained from the second clock signal and a clock halt portion receiving the third clock signals and selectively outputting only one of the third clock signals according to the information. The integrated circuit device further includes a timer activated only when receiving the one of the third clock signals and converting the frequency of the received clock signal for output and a clock synchronization serial port receiving the clock signal outputted from the timer and one of the other third clock signals, and supplying either one of the received clock signals to the peripheral device according to the information.

12 Claims, 4 Drawing Sheets

US 7,065,667 B2

INTEGRATED CIRCUIT DEVICE TO GENERATE A CLOCK OF A SUITABLE FREQUENCY FOR OPERATING A PERIPHERAL DEVICE

BACKGROUND OF THE INVENTION

The present invention relates to an integrated circuit device having a clock synchronization serial port function and timer function and including a microcomputer. More particularly, the invention relates to an integrated circuit device capable of achieving low power consumption.

As the conventional integrated circuit devices including microcomputers, there is one disclosed in JP-A-2001-325244. The invention disclosed in this publication relates to a semiconductor device having a timer function, as well as to a microcomputer and an electronic device. A semiconductor device 10 comprises a CPU 40, a timer controller circuit 30, a timer circuit 20, a port-output controller circuit 60 and the like. The timer circuit 20 performs a counting operation based on a timer value stored in a timer setting register 22. When a counter 24 overflows, the timer circuit generates a timer overflow signal, which is converted into a baud-rate clock by the port-output controller circuit 60 so as to be sent to a function block such as a clock synchronization serial port block or the like. The baud-rate clock is used as a master clock for a peripheral device in order that the semiconductor device may communicate with the peripheral device connected with the clock synchronization serial port block.

Unfortunately, the above conventional example involves a problem of high current consumption because the timer circuit must be constantly maintained operative for generating a baud-rate clock for the clock synchronization serial port block connected with a peripheral device communicating therewith at any frequency.

SUMMARY OF THE INVENTION

The present invention may provide an integrated circuit device adapted to generate a clock of a suitable frequency for operating a peripheral device while consuming less power.

An integrated circuit device according to the invention comprises on assumption that it is externally connected with an peripheral device operated by a first clock signal of a predetermined frequency: a CPU having information on the frequency of the first clock signal; a clock generator generating a second clock signal for operating the CPU and outputting a plurality of third clock signals obtained by dividing the frequency of the second clock signal; a clock halt portion receiving the third clock signals from the clock generator and selectively outputting only one of the third clock signals according to the information from the CPU; a timer activated only when receiving the one of the third clock signals from the clock halt portion and converting the frequency of the received clock signal for output; and a clock synchronization serial port receiving the clock signal outputted from the timer and (one of) the other third clock signal(s) outputted from the clock generator, and supplying either one of the received clock signals to the peripheral device according to the information from the CPU.

DETAILED DESCRIPTION OF THE PREFERRED EMBODIMENTS

Figure 1:
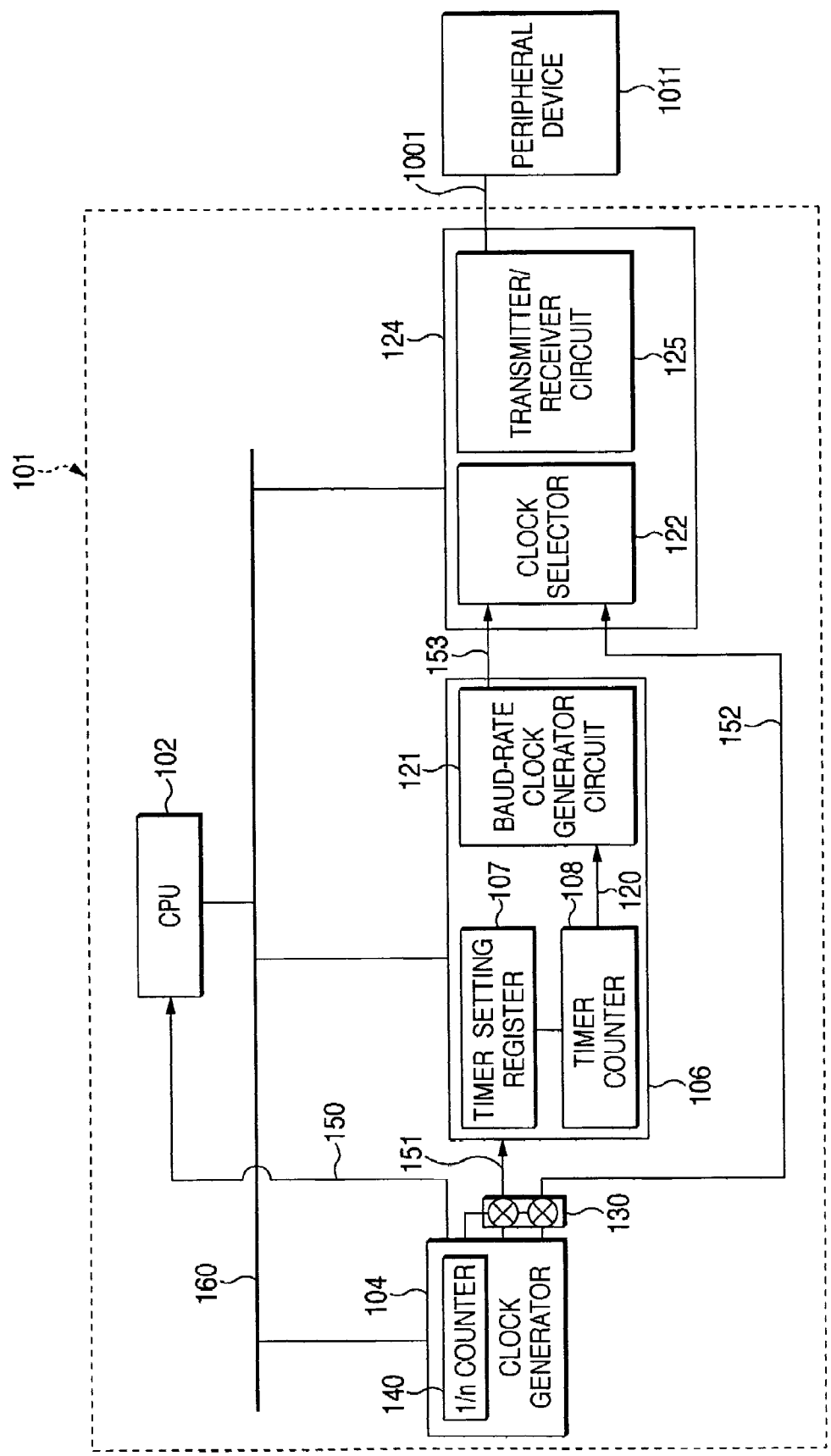
FIG. 1 is a block diagram showing an integrated circuit device according to a first embodiment of the invention.

FIG. 1 illustrates an integrated circuit device according to a first embodiment of the invention. The first embodiment of the invention will hereinbelow be described with reference to FIG. 1.

An integrated circuit device of the first embodiment 101 comprises a CPU 102, a clock generator 104, a timer 106, a clock synchronization serial port 124 and a clock halt module 130. The clock generator 104 includes a 1/n counter 140. Therefore, the clock generator 104 is capable of outputting a clock signal of a predetermined frequency and a clock signal having a frequency of 1/n of the above frequency. The timer 106 includes therein a timer setting register 107, a timer counter 108 and a baud-rate clock generator circuit 121. The clock synchronization serial port 124 includes a clock selector 122 and a transmitter/receiver circuit 125. The CPU 102, clock generator 104, timer 106 and clock synchronization serial port 124 are interconnected via a CPU bus 160.

A first clock signal 150 outputted from the clock generator 104 has a frequency of 30 MHz and is supplied to the CPU 102. A second clock signal 151 outputted from the clock generator 104 has a frequency of 7.5 MHz and is supplied to the timer 106 via the clock halt module 130. A third clock signal 152 outputted from the clock generator 104 has a frequency of 15 MHz and is supplied to the clock selector 122 via the clock halt module 130.

An overflow signal 120 is outputted from the timer counter 108 based on a setting of the timer setting register 107 and is supplied to the baud-rate clock generator circuit 121. A clock signal 153 outputted from the baud-rate clock generator circuit 121 has a frequency of 0 to 1.875 MHz according to the setting of the timer setting register 107. The clock signal 153 is supplied to the clock selector 122.

The clock synchronization serial port 124 and a peripheral device 1011 as an external device of the integrated circuit device 101 are interconnected via an external terminal 1001. It is noted here that examples of a conceivable peripheral device 1011 include a multimedia card and SD card operative at a frequency of 15 MHz, and an FM/AM tuner PLL, RTC (clock timer), LCD driver and the like which are operative at frequencies of not more than 1 MHz.

Next, operations of the first embodiment are described with reference to FIG. 1.

The integrated circuit device 101 communicates with the peripheral device 1011 based on the following procedure. Firstly, a frequency of the clock signal outputted from the clock generator 104 is defined based on specifications of the CPU 102. As mentioned above, the first clock signal 150 has the frequency of 30 MHz, the second clock signal 151 having the frequency of 7.5 MHz, the third clock signal 152 having the frequency of 15 MHz. Next, the CPU 102 defines a value for the timer setting register 107 as well as a period of the timer counter 108. The overflow signal 120 outputted from the timer counter 108 is received by the baud-rate clock generator circuit 121 which, in turn, outputs the clock signal 153 the frequency of which is determined based on the overflow signal 120. According to the first embodiment, the baud-rate clock generator circuit 121 is capable of outputting the clock signal 153 having a frequency in the range of 0 to 1.875 MHz, as described above.

The CPU 102 outputs a signal for switching the clock selector 122. Responding to this signal, the clock selector 122 selects either the third clock signal 152 outputted from the clock generator 104 or the clock signal 153 outputted from the timer 106. In the clock synchronization serial port 124, the transmitter/receiver circuit 125 communicates with the external peripheral device 1011 via the external terminal 1001 at a speed of the frequency of the clock signal selected by the clock selector 122.

In a case where the peripheral device 1011 is operated by a clock signal of a frequency of 1.875 MHz or less, the clock signal 153 outputted from the timer 106 is required. Therefore, the clock halt module 130 disables the third clock signal 152 while supplying the second clock signal 151 to the timer. Thus, the timer 106 continues to operate.

On the other hand, in a case where the peripheral device 1011 is operated by the clock signal of a frequency of 15 MHz, only the third clock signal 152 is required so that the clock signal 153 from the timer 106 is not needed. Therefore, the clock halt module 130 disables the second clock signal 151 so that the timer 106 is deactivated. Thus, when connected with the peripheral device operating at 15 MHz, the integrated circuit device of the first embodiment can decrease the power consumption of the timer 106.

According to the first embodiment, the deactivation of the timer 106 depends upon the type of the peripheral device 1011 to be connected with the integrated circuit device 101. That is, the timer 106 is an initially unrequired circuit if the peripheral device 1011 operates at 15 MHz. However, the integrated circuit device 101 is designed to operate with any types of peripheral devices. It is noted that the embodiment differs from a selective disabling system wherein the CPU 102 determines the type of a connected peripheral device and disables the timer 106 according to the determination thus made. Such a selective disabling system has a drawback of an unstable clock signal output.

According to the description of the above embodiment, the timer 106 is deactivated by canceling the supply of the second clock signal 151 to the timer 106. In an alternative approach, however, the CPU 102 may output a disable signal to the timer 106 thereby deactivating the timer 106. Specifically, when a type of the peripheral device 1011 connected with the integrated circuit device 101 is determined, a clock frequency required by the peripheral device 1011 is determined and information representative of the decided clock frequency is programmed in the CPU 102. This permits the CPU 102 to determine whether to output the disable signal to the timer 106 or not according to the information thus programmed. In the case where the disable signal is used to deactivate the timer 106, the clock halt module 130 may continue to output the second clock signal 151 or stop outputting the signal.

The 1/n counter 140 disposed in the clock generator 104 is constantly operating to output the clock signals 151, 152, the frequencies of which are given by dividing that of the first clock signal 150. However, the 1/n counter 140 consumes such a small power as considered to be negligible in comparison with the power consumed by the timer 106. Although the first embodiment employs the 1/n counter 140 for dividing the frequency of the clock signal, it goes without saying that other frequency dividing means such as a frequency divider or the like may be used.

Figure 2:
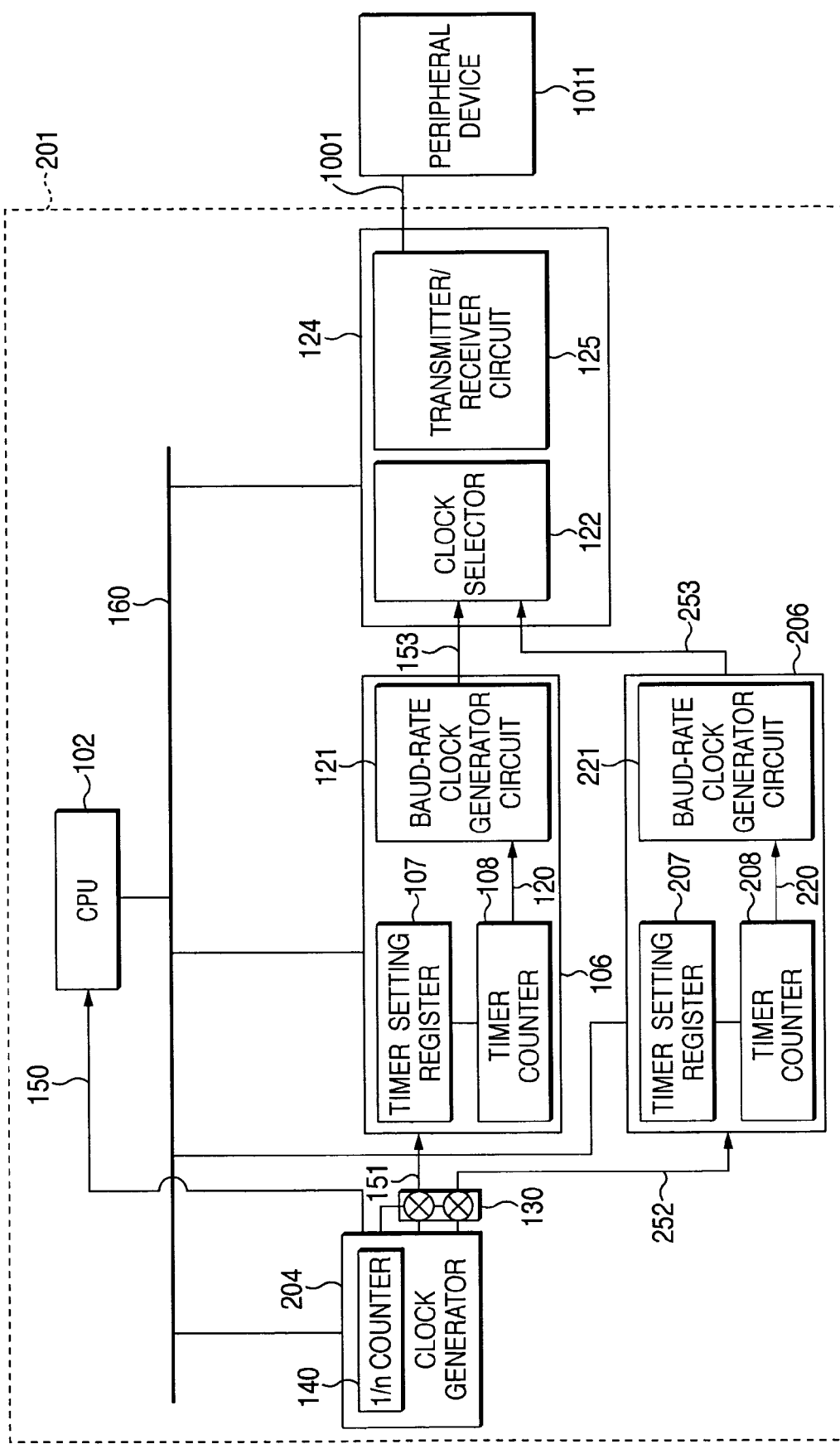
FIG. 2 is a block diagram showing an integrated circuit device according to a second embodiment of the invention.

FIG. 2 illustrates an integrated circuit device according to a second embodiment of the invention. The second embodiment will hereinbelow be described with reference to FIG. 2. In FIG. 2, like parts to those of FIG. 1 are represented by the same reference characters, respectively, and the description thereof is dispensed with.

An integrated circuit device 201 of the second embodiment comprises the CPU 102, a clock generator 204, the first timer 106, a second timer 206, the clock synchronization serial port 124, and the clock halt module 130. The clock generator 204 includes the 1/n counter 140. The second timer 206 includes therein a timer setting register 207, a timer counter 208, and a baud-rate clock generator circuit 221.

The first clock signal 150 outputted from the clock generator 204 has a frequency of 30 MHz and is supplied to the CPU 102. The second clock signal 151 outputted from the clock generator 104 has a frequency of 7.5 MHz and is supplied to the first timer 106 via the clock halt module 130. A third clock signal 252 outputted from the clock generator 104 has the same frequency of 30 MHz as the first clock signal and is supplied to the second timer 206 via the clock halt module 130.

An overflow signal 220 is outputted from the timer counter 208 based on a setting of the timer setting register 207 and supplied to the baud-rate clock generator circuit 221. A clock signal 253 outputted from the baud-rate clock generator circuit 221 has a frequency of 1.875 to 15 MHz according to the setting of the timer setting register 207. The clock signal 253 is supplied to the clock selector 122.

Next, operations of the second embodiment are described with reference to FIG. 2.

The integrated circuit device 201 communicates with the peripheral device 1011 based on the following procedure. Firstly, similarly to the first embodiment, a frequency of the first clock signal 150 is defined to be 30 MHz. In the second embodiment, the second clock signal 151 is defined to be 7.5 MHz, whereas the third clock signal 252 is defined to be 30 MHz. Next, the CPU 102 defines values for the timer setting registers 107, 207 as well as periods of the timer counters 108, 208. The overflow signals 120, 220 outputted from the timer counters 108, 208 are received by the baud-rate clock generator circuits 121, 221 which, in turn, output the clock signals 153, 253, the frequencies of which are determined based on the overflow signals 120, 220, respectively. As mentioned supra, the baud-rate clock generator circuit 121 is capable of outputting the clock signal 153 of a frequency in the range of 0 to 1.875 MHz, whereas the baud-rate clock generator circuit 221 is capable of outputting the clock signal 253 of a frequency in the range of 1.875 to 15 MHz.

The CPU 102 outputs the signal for switching the clock selector 122. Responding to this signal, the clock selector 122 selects either the clock signal 153 outputted from the timer 106 or the clock signal 253 outputted from the timer 206. In the clock synchronization serial port 124, the transmitter/receiver circuit 125 communicates with the external peripheral device 1011 via the external terminal 1001 at a speed of the frequency of the clock signal selected by the clock selector 122.

In a case where the peripheral device 1011 is operated by a clock signal of 1.875 MHz or less, the clock signal 153 outputted from the timer 106 is required. Accordingly, the clock halt module 103 disables the third clock signal 252 while supplying the second clock signal 151 to the timer. Therefore, the timer 106 continues to operate while the timer 206 is deactivated.

On the other hand, in a case where the peripheral device 1011 is operated by a clock signal of a frequency of 1.875 to 15 MHz, the clock signal 253 outputted from the timer 206 is required but the clock signal 153 outputted from the timer 106 is not needed. Accordingly, the clock halt module 130 disables the second clock signal 151 so that the timer 106 is deactivated. Thus, the timer 206 is in operation while the timer 106 is in deactivation.

The timer 106 is operated by the second clock signal 151 of 7.5 MHz, thus consuming not more than ¼ of the power consumed by the timer 206 operated by the third clock signal 252 of 15 MHz. In the case where the peripheral device 1011 is operated by the clock signal of 1.875 MHz or less, therefore, the peripheral device 1011 can be operated with less power consumption than where it is operated by the clock signal of a frequency of 1.875 to 15 MHz. It is also possible to provide a greater number of setting stages by making an arrangement wherein the clock generator 204 is adapted to output a greater number of clock signals whereas timers are dedicated to individual clock signal outputs. However, only any one of the timers is used after all and hence, the design of the integrated circuit device 201 may be decided based on preference given to either of the low power consumption and the addition of the timers.

The deactivation of the timer 106 or 206 according to the second embodiment depends upon the peripheral device 1011 to be connected with the integrated circuit device 201. Thus, either one of the timers 106 and 206 is an initially unrequired circuit but the integrated circuit device 201 is designed to operate with any types of peripheral devices. It is noted that similarly to the first embodiment, the second embodiment differs from the selective disabling system.

According to the description of the above embodiment, either one of the timers 106 and 206 is deactivated by canceling the supply of the clock signal 151 or 252 to the timer 106 or 206. Similarly to the first embodiment, however, an arrangement may be made such that the CPU 102 outputs a disable signal to the timer 106 or 206 thereby deactivating the timer 106 or 206. Furthermore, the same description as in the first embodiment is also applied to the 1/n counter disposed in the clock generator 204.

Figure 3:
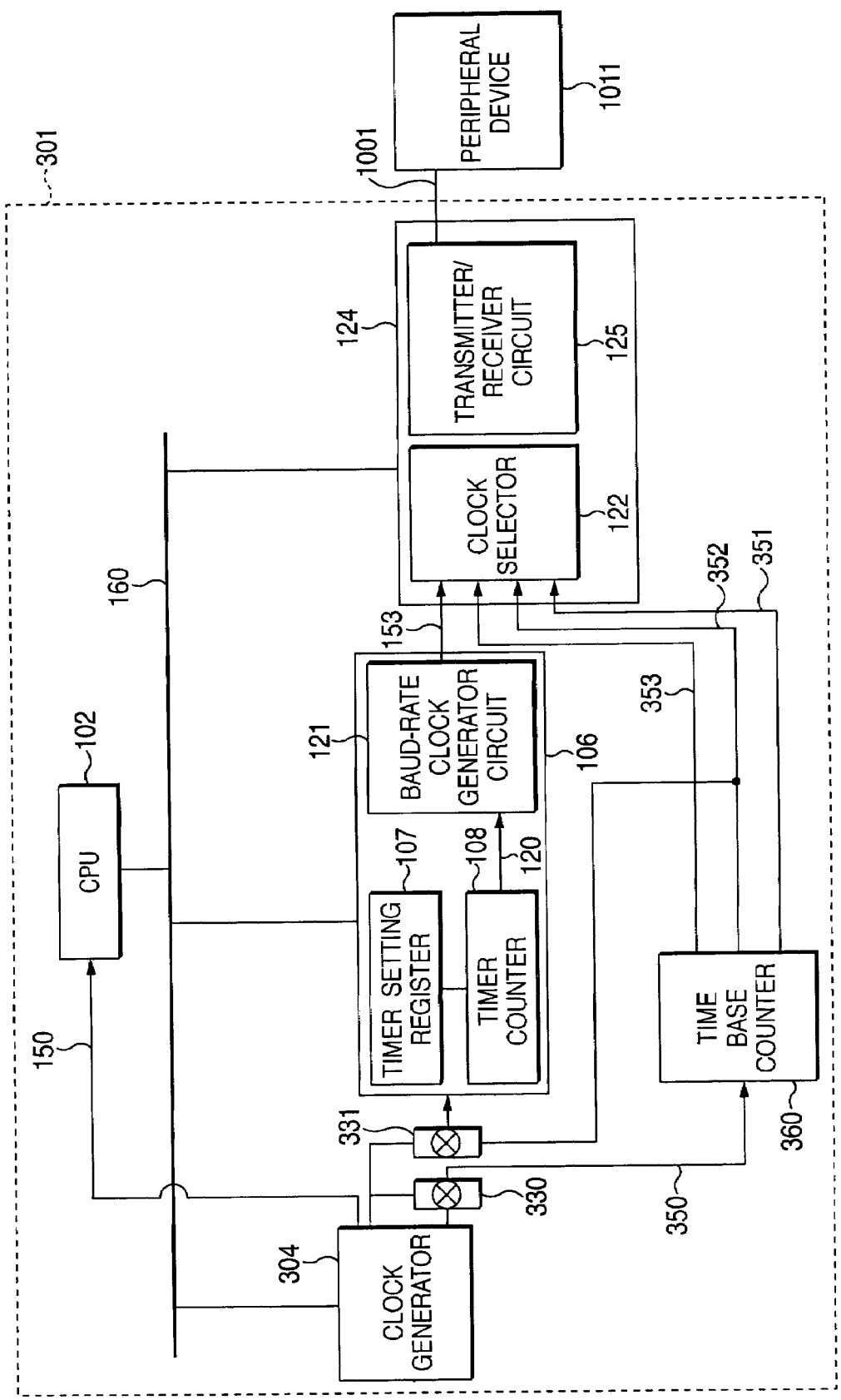
FIG. 3 is a block diagram showing an integrated circuit device according to a third embodiment of the invention.

FIG. 3 illustrates an integrated circuit device according to a third embodiment of the invention. The third embodiment will hereinbelow be described with reference to FIG. 3. In FIG. 3, like parts to those of FIGS. 1 and 2 are represented by the same reference characters, respectively, and the description thereof is dispensed with.

An integrated circuit device 301 of the third embodiment comprises the CPU 102, a clock generator 304, the timer 106, a time base counter 360, the clock synchronization serial port 124 and clock halt modules 330, 331.

The first clock signal 150 outputted from the clock generator 304 has a frequency of 30 MHz and is supplied to the CPU 102. A second clock signal 350 outputted from the clock generator 304 has a frequency of 30 MHz and is supplied to the time base counter 360 via the clock halt module 330. Receiving the second clock signal 350, the time base counter 360 divides the frequency thereof to provide outputs of a third clock signal 351 of 15 MHz, a fourth clock signal 352 of 7.5 MHz, and a fifth clock signal 353 of 3.75 MHz. The third to fifth clock signals 351, 352, 353 are all supplied to the clock selector 122 of the clock synchronization serial port 124. The fourth clock signal 352 is also supplied to the timer 106 via the clock halt module 331.

Next, operations of the third embodiment are described with reference to FIG. 3.

The integrated circuit device 301 communicates with the peripheral device 1011 based on the following procedure. Firstly, similarly to the first embodiment, a frequency of the first clock signal 150 is defined to be 30 MHz. Then, the CPU 102 defines a value for the timer value setting register 107 so that the clock signal 153 of a predetermined frequency is outputted from the baud-rate clock generator circuit 121. As mentioned supra, the baud-rate clock generator circuit 121 is capable of outputting the clock signal 153 of a frequency in the range of 0 to 1.875 MHz.

The CPU 102 outputs the signal for switching the clock selector 122. Responding to this signal, the clock selector 122 selects either the clock signal 153 outputted from the timer 106 or any one of the third to fifth clock signals 351–353 outputted from the time base counter 360. In the clock synchronization serial port 124, the transmitter/receiver circuit 125 communicates with the external peripheral device 1011 via the external terminal 1001 at a speed of the frequency of the clock signal selected by the clock selector 122.

In a case where the peripheral device 1011 is operated by a clock signal of a frequency of 1.875 MHz or less, the clock signal 153 outputted from the timer 106 is required. Accordingly, the clock halt module 103 supplies the fourth clock signal 352 to the timer. Thus, the timer 106 is allowed to operate.

On the other hand, in a case where the peripheral device 1011 is operated by anyone of the clock signals of the frequencies of 3.75 MHz, 7.5 MHz and 15 MHz, the clock signal 153 outputted from the timer 106 is not required. Hence, the clock halt module 330 disables the fourth clock signal 352 so that the timer 106 stops its operation. On the other hand, the clock selector 122 responds to a signal from the CPU 102 to select any one of the third to fifth signals 351 to 353.

The time base counter 360 is a circuit simply for dividing the clock, consuming quite a small power just like the 1/n counter 140 described in the first embodiment. Specifically, the power consumption of the time base counter is on the order of 1/100 of that of the timer 106. In the case where the peripheral device 1011 is operated by the clock signal of 3.75 MHz, 7.5 MHz or 15 MHz, the peripheral device 1011 can be operated with less power consumption than in the case where it is operated by the clock signal of a frequency of 0 to 1.875 MHz.

The timer 106 of the third embodiment is an initially unnecessary circuit just like that of the first embodiment. However, since the integrated circuit device 301 is designed to operate with any type of peripheral device, the timer 106 cannot be dispensed with. Similarly to the first embodiment, the third embodiment differs from the selective disabling system.

Figure 4:
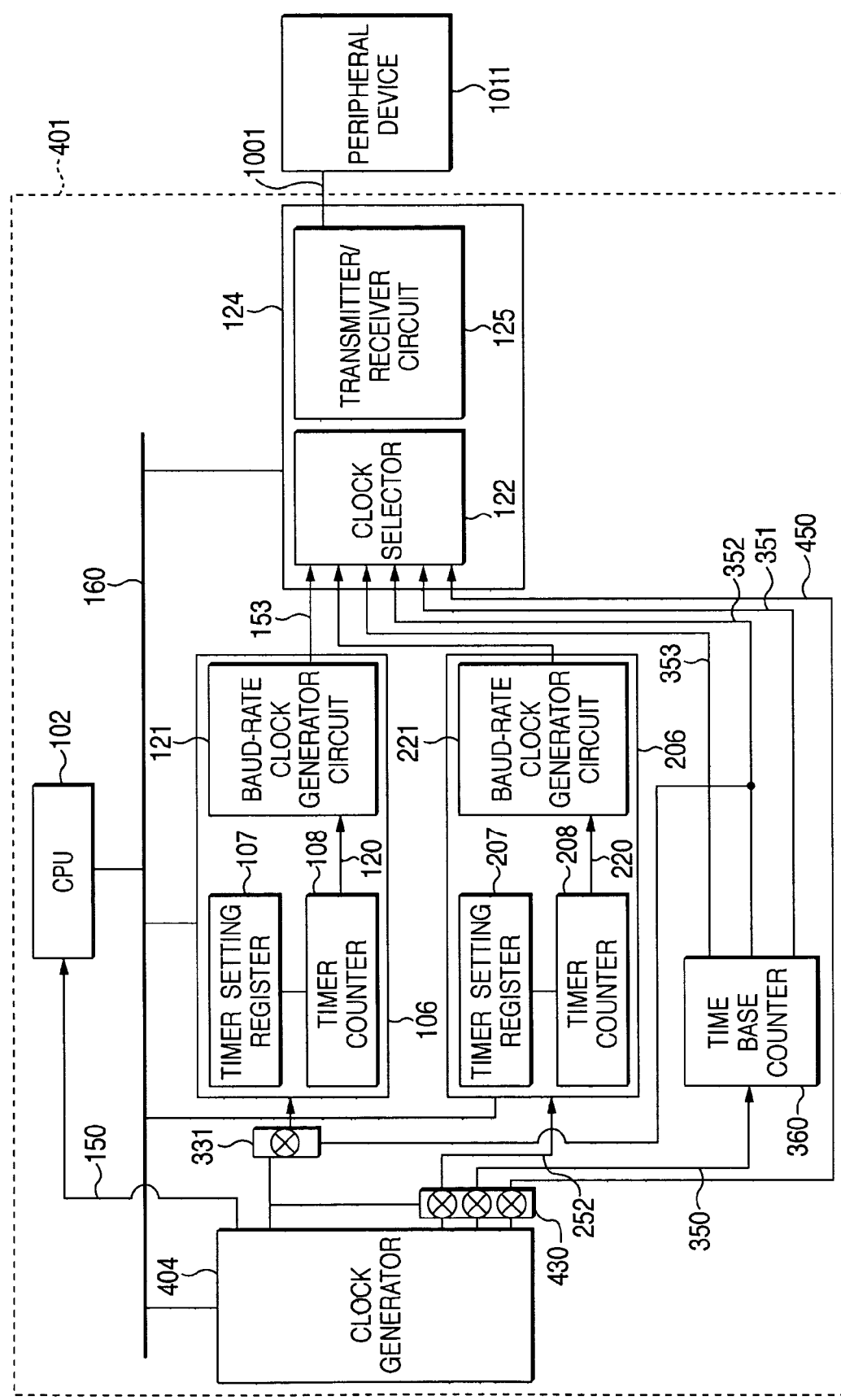
FIG. 4 is a block diagram showing an integrated circuit device according to a fourth embodiment of the invention.

FIG. 4 illustrates an integrated circuit device according to a fourth embodiment of the invention. The fourth embodiment will hereinbelow be described with reference to FIG. 4. In FIG. 4, like parts to those of FIGS. 1 to 3 are represented by the same reference characters, respectively, and the description thereof is dispensed with.

An integrated circuit device 401 of the fourth embodiment comprises the CPU 102, a clock generator 404, the first timer 106, the second timer 206, the time base counter 360, the clock synchronization serial port 124, and clock halt modules 430, 331. The integrated circuit device 401 of the fourth embodiment is composed by combining the features of the integrated circuit devices of the first to third embodiments.

The clock generator 404 outputs the first to fourth clock signals 150, 252, 350 and 450 which all have a frequency of 30 MHz. The first clock signal 150 is directly supplied to the CPU 102, whereas the second to fourth clock signals 252, 350, 450 are supplied to the second timer 206, time base counter 360 and clock selector 122 via the clock halt module 430, respectively. Similarly to the second embodiment, the second clock signal 252 is supplied to the second timer 206, which outputs to the clock selector 122 the clock signal 253 of the frequency in the range of 1.875 to 15 MHz. Similarly to the third embodiment, the third clock signal 350 is supplied to the time base counter 360, which supplies the clock signal 153 of 0 to 1.875 MHz to the clock selector 122 via the first timer 106 and also supplies the clock signal 351 of 3.75 MHz, the clock signal 352 of 7.5 MHz, and the clock signal 353 of 15 MHz to the clock selector 122. The fourth clock signal 450 is directly supplied to the clock selector 122 similarly to the first embodiment.

Next, operations of the fourth embodiment will be described with reference to FIG. 4.

The integrated circuit device 401 communicates with the peripheral device 1011 based on the following procedure. Firstly, similarly to the first embodiment, the frequency of the first clock signal 150 is defined to be 30 MHz. Then, similarly to the second embodiment, the CPU 102 defines values for the timer setting registers 107, 207 so that the baud-rate clock generator circuits 121, 221 output the clock signals 153, 253 of predetermined frequencies. As mentioned supra, the baud-rate clock generator circuit 121 is capable of outputting the clock signal 153 of a frequency in the range of 0 to 1.875 MHz, whereas the baud-rate clock generator circuit 221 is capable of outputting the clock signal 153 of a frequency in the range of 1.875 to 15 MHz.

The CPU 102 outputs the signal for switching the clock selector 122. In response to this signal, the clock selector 122 selects a desired clock signal from the clock signals 153, 253, 351, 352, 353 and 450. In the clock synchronization serial port 124, the transmitter/receiver circuit 125 communicates with the external peripheral device 1011 via the external terminal 1001 at a speed of the frequency of the clock signal selected by the clock selector 122.

In a case where the peripheral device 1011 is operated by any one of the clock signals of 3.75 MHz, 7.5 MHz, 15 MHz and 30 MHz, the clock signals 153, 253 outputted from the timers 106, 206 are not required. Accordingly, the clock halt module 430 disables the second clock signal 252, while the clock halt module 331 disables the clock signal 352, so that the timers 106, 206 are deactivated. On the other hand, the clock selector 122 responds to the signal from the CPU 102 to select any one of the clock signals 351 to 353 and 450.

The time base counter 360 is a circuit simply for dividing the clock, consuming quite a small power just like the 1/n counter 140 described in the first embodiment. Specifically, the power consumption of the time base counter is on the order of 1/100 of that of the timer 106. In the case where the peripheral device 1011 is operated by the clock signal of 3.75 MHz, 7.5 MHz or 15 MHz, the peripheral device 1011 can be operated with less power consumption than in the case where it is operated by the clock signal of a frequency of 0 to 1.875 MHz.

A case where the peripheral device requires a clock signal of any frequency less than 15 MHz presents the same situation as in the second embodiment and hence, the description thereof is dispensed with.

In some cases, the timers 106, 206 of the fourth embodiment maybe initially unnecessary circuits. However, the integrated circuit device 401 is designed to operate with any type of peripheral device and hence, the timers cannot be obviated. Similarly to the first embodiment, the fourth embodiment differs from the selective disabling system.

What is claimed is:

1. An integrated circuit device to be connected externally with a peripheral device operated by a first clock signal of a predetermined frequency, comprising:
    a CPU having information on the frequency of the first clock signal;
    a clock generator generating a second clock signal for operating the CPU and outputting a plurality of third clock signals obtained by dividing the frequency of the second clock signal;
    a clock halt portion receiving the third clock signals from the clock generator and selectively outputting only one of the third clock signals according to the information from the CPU;
    a timer activated only when receiving the one of the third clock signals from the clock halt portion and converting the frequency of the received clock signal for output; and
    a clock synchronization serial port receiving the clock signal outputted from the timer and one of the other third clock signal(s) from the clock generator, and supplying either one of the received clock signals to the peripheral device according to the information from the CPU.

2. An integrated circuit device as claimed in claim 1, wherein the clock generator includes a 1/n counter.

3. An integrated circuit device as claimed in claim 1, wherein the clock synchronization serial port includes a clock selector.

4. An integrated circuit device as claimed in claim 1, wherein the timer receives a disable signal according to the information from the CPU and is deactivated by the disable signal.

5. An integrated circuit device to be connected externally with a peripheral device operated by a first clock signal of a predetermined frequency, comprising:
    a CPU having information on the frequency of the first clock signal;
    a clock generator generating a second clock signal for operating the CPU and outputting a plurality of third clock signals obtained by dividing the frequency of the second clock signal;
    a clock halt portion receiving the third clock signals from the clock generator and selectively outputting only one of the third clock signals according to the information from the CPU;
    a first and second timers individually activated only when receiving a respective one of the third clock signals from the clock halt portion and converting the frequency of the received clock signal for output; and
    a clock synchronization serial port receiving the respective clock signals from the first and second timers, and supplying either one of the received clock signals to the peripheral device according to the information from the CPU.

6. An integrated circuit device as claimed in claim 5, wherein the clock generator includes a 1/n counter.

7. An integrated circuit device as claimed in claim 5, wherein the clock synchronization serial port includes a clock selector.

8. An integrated circuit device as claimed in claim 5, wherein the first and second timers receive a first and second disable signals according to the information from the CPU, respectively, and the first and second timers are respectively deactivated by the first and second disable signals.

9. An integrated circuit device to be connected externally with a peripheral device operated by a first clock signal of a predetermined frequency, comprising:
- a CPU having information on the frequency of the first clock signal;
- a clock generator generating and outputting a second clock signal for operating the CPU;
- a frequency divider circuit receiving the second clock signal from the clock generator and outputting a plurality of third clock signals obtained by dividing the frequency of the second clock signal;
- a clock halt portion receiving one of the third clock signals from the frequency divider circuit and outputting the received clock signal according to the information from the CPU;
- a timer activated only when receiving the one of the third clock signals from the clock halt portion and converting the frequency of the received clock signal for output; and
- a clock synchronization serial port receiving the clock signal outputted from the timer and the third clock signals from the frequency divider circuit, and supplying one of the received clock signals to the peripheral device according to the information from the CPU.

10. An integrated circuit device as claimed in claim 9, wherein the clock synchronization serial port includes a clock selector.

11. An integrated circuit device as claimed in claim 9, wherein the timer receives a disable signal according to the information from the CPU and is deactivated by the disable signal.

12. An integrated circuit device as claimed in claim 9, further comprising:
- another clock halt portion receiving a second clock signal from the clock generator and outputting the received clock signal according to the information from the CPU; and
- another timer activated only when receiving the one of the second clock signals from the another clock halt portion and converting the frequency of the received clock signal for output;
- wherein the clock synchronization serial port receives the clock signal outputted from the timer, the clock signal outputted from the another timer, the second clock signal received from the another clock halt portion and the third clock signals from the frequency divider circuit, and supplies one of the received clock signals to the peripheral device according to the information from the CPU.

* * * * *